United States Patent Office 2,786,781
Patented Mar. 26, 1957

2,786,781
PROCESS OF RECOVERING NYSTATIN

John Vandeputte, Milltown, and William Gold, Highland Park, N. J., assignors to Olin Mathieson Chemical Corporation, New York, N. Y., a corporation of Virginia No Drawing. Application November 4, 1954, Serial No. 466,952

4 Claims. (Cl. 167—65)

The present invention relates to the antifungal antibiotic fungicidin (nystatin). More specifically, the invention relates to improved processes of recovering fungicidin (nystatin) in good yield and good purity.

The antibiotic fungicidin (nystatin) and its method of preparation from *Streptomyces noursei* are described in the copending application of Hazen and Brown, Serial No. 208,978, filed January 12, 1951. See also Hazen, E. L. and Brown, R. "Fungicidin, An Antibiotic Produced by a Soil Actinomycete," Proc. Soc. Exptl. Biol. Med. 76:93 (1950) and Brown, R., Hazen E. L. and Mason, A., "Effect of Fungicidin (nystatin) in Mice Injected with Lethal Mixtures of Aureomycin and *Candida albicans*," Science 117:609 (1953). The antibiotic is referred to hereinafter by the single term "nystatin."

Crude concentrates of nystatin can be prepared by extracting the mycelial mat with several portions of methanol and then processing the methanolic solution by fractional precipitation with ethyl acetate, washing the precipitate with 0.85% NaCl solution, resolution in methanol and fractional precipitation with ether. See Hazen and Brown, Ser. No. 208,978, supra. Low yields of active crystalline material can be obtained from the resulting crude concentrates by distribution between butanol and saline and by partial precipitation from methanol. Crystalline nystatin of high purity has been obtained by distribution of partially purified nystatin concentrates in a biphasic system made up by mixing n-butanol, methanol, water and hexane and allowing this system to stand exposed to air evaporation until a crop of crystals collects at the interface. Dutcher, James D. et al., Antibiotics Annual 1953–1954, pages 191–194, Medical Encyclopedia, Inc. New York, N. Y.

The processes described above produce crystalline nystatin but are objectionable due to the presence of impurities or low yields. They are also objectionable as they are relatively difficult to control and are not of the type desired in large-scale commercial operations.

In our research investigations in this field we discovered that nystatin could be readily recovered by extraction of the whole broth (rather than the mycelial mat) by a water miscible organic solvent in accordance with the process described below.

Example

To the nystatin whole broth resulting from the fermentation of *Streptomyces noursei* in an aqueous soy meal-glucose nutrient medium is first added an equal volume of isopropanol. The pH of the mixture is then lowered to about 5 with phosphoric acid. After stirring for about 1 hour, the pH is brought up to about 7 by addition of sodium hydroxide. The resulting mixture is then filtered preferably with a filter aid. This removes a large percentage of impurities. The isopropanol is then evaporated from the filtrate preferably under vacuum at a temperature of about 30° C. or less. When the alcohol is removed, partially crystalline nystatin of about 65–70% purity and in about 70–75% yield precipitates. The precipitate is filtered or centrifuged off, washed with a little water, washed with acetone and dried. Methanol can be used in place of isopropanol, but the yields are materially reduced being of the order of about 50–55%. The use of isopropanol or normal propanol in place of other water miscible organic solvents (e. g. ethanol, methanol, acetone, etc.) is also preferred as the propanols remove (precipitate) much more of the impurities, e. g., proteins, saccharides, etc., which interfere with the recovery in good yield of good purity nystatin.

The lowering of the pH by addition of acidic material to about pH 4–6 and preferably 4.5–5.5 aids in solubilizing the nystatin in the aqueous-organic solvent medium. The adjustment of the pH by addition of alkaline material to about pH 6.5–7.5 and preferably about 7 aids in the precipitation of the nystatin when the organic solvent is removed. The adjustment of the pH as indicated above while optional is nevertheless highly preferred as it aids materially in the over-all recovery of good purity nystatin in the desired high yields. Any soluble acid or alkali or equivalent acidic or alkaline material can be employed to adjust the pH to the desired values shown above. The amount of water miscible organic solvent to be employed with the nystatin containing aqueous broth can vary from about 40–75 percent or more by volume based on the total volume of solvent and broth. Optimum amounts of a particular solvent to be employed with a particular broth can be readily ascertained by preliminary test.

It is claimed:

1. The process of recovering nystatin from a *Streptomyces noursei* fermentation broth which comprises adding a water miscible organic solvent selected from the group consisting of isopropanol and n-propanol to the broth to provide a mixture containing 40–75 percent by volume of solvent based on the total volume of solvent and broth, adjusting the pH of the resulting aqueous organic solvent medium to about pH 4–6 and then to about pH 6.5–7.5, filtering the mixture to remove undissolved material, removing the organic solvent from the resulting filtrate by evaporation and recovering the resulting precipitate.

2. The process of recovering nystatin from a *Streptomyces noursei* fermentation broth which comprises adding about an equal volume of water miscible organic solvent selected from the group consisting of isopropanol and n-propanol to the broth, adjusting the pH of the resulting aqueous organic solvent medium to about 4.5–5.5, stirring the resulting acidic mixture, adjusting the pH of the mixture to about 7, filtering the resulting neutral mixture, removing the organic solvent from the filtrate by evaporation, and recovering the resulting precipitate.

3. The process of recovering nystatin from an aqueous *Streptomyces noursei* fermentation broth which comprises adding about an equal volume of isopropanol to the broth, adding sufficient acid to lower the pH of the aqueous-alcohol broth to about 5, stirring the resulting acidic mixture, adding sufficient alkali to bring the pH of the broth up to about 7, filtering the resulting neutral mixture, removing the isopropanol from the filtrate by evaporation under vacuum at a temperature up to about 30° C. and recovering the resulting precipitate.

4. In the process of recovering nystatin from an aqueous *Streptomyces noursei* fermentation broth, the steps which comprise adding isopropanol to the broth to provide a mixture containing 40–75 percent by volume of isopropanol based on the total volume of isopropanol and broth, filtering the resulting mixture, removing the isopropanol from the filtrate by evaporation under vacuum and recovering the resulting nystatin precipitate.

(References on following page)

References Cited in the file of this patent

UNITED STATES PATENTS

| | | |
|---|---|---|
| 2,474,758 | Peck | June 28, 1949 |
| 2,505,053 | Kuehl | Apr. 25, 1950 |

FOREIGN PATENTS

| | | |
|---|---|---|
| 714,189 | Great Britain | Aug. 25, 1954 |

OTHER REFERENCES

Brown et al.: Proc. Soc. Exptl. Biol. & Med. July 1949, pp. 454–457.

Hazen et al.: Proc. Soc. Exptl. Biol. and Med., vol. 76 No. 1, January 1951, pp. 93–97.

Lechevalier et al.: Reprint from Mejcologia, vol. XLV, No. 2, 155–171, March-April 1953.